United States Patent [19]
Muffoletto et al.

[11] Patent Number: 5,882,362
[45] Date of Patent: Mar. 16, 1999

[54] INSULATING ENCLOSURE FOR LITHIUM BATTERIES

[75] Inventors: Barry C. Muffoletto, Alden; Raymond J. Kuwik, Lancaster, both of N.Y.

[73] Assignee: Wilson Greatbatch Ltd., Clarence, N.Y.

[21] Appl. No.: 67,846

[22] Filed: Apr. 27, 1998

Related U.S. Application Data

[62] Division of Ser. No. 761,164, Dec. 6, 1996, Pat. No. 5,744,261, which is a continuation of Ser. No. 886,725, May 21, 1992, abandoned.

[51] Int. Cl.⁶ .................................................. H01M 10/38
[52] U.S. Cl. ......................................... 29/623.1; 29/623.2
[58] Field of Search ............................... 29/623.2, 623.1; 429/163, 185; 264/272.21

[56] References Cited

U.S. PATENT DOCUMENTS

| | | | |
|---|---|---|---|
| 4,530,153 | 7/1985 | Pearson | 29/623.1 |
| 5,270,133 | 12/1993 | Baumann, III | 29/623.1 X |
| 5,663,007 | 9/1997 | Skoma et al. | 29/623.1 X |

*Primary Examiner*—Anthony Skapars
*Attorney, Agent, or Firm*—Hodgson, Russ, Andrews, Woods & Goodyear LLP

[57] ABSTRACT

A lithium electrochemical cell including an anode and cathode assembly with the anode connected electrically to a conductive cell casing and an insulated cathode conductor extending through a lid at an end of the casing and connected to a cathode lead near the lid and with a first insulating component for insulating the casing from cell components therein and extending along and within the casing from a closed end thereof toward the lid, and which is characterized by a second insulating component for insulating the lid from components in the casing and extending along within the lid and toward the first insulating bag so as to prevent a short circuit between the lid or casing and the cathode assembly caused by formation of lithium clusters in the region between the lid or casing and the cathode connector. Preferably the second insulating component is in the form of a cup having a relatively thin base portion extending along the lid and a relatively thin wall portion extending from the base along within the casing and toward the first insulating component which also is in the form of a thin-walled cup. The walls of the first and second insulating components preferably meet in overlapping relation. The insulating arrangement is particularly adapted for use in a cell wherein the anode and cathode assembly comprises a plurality of cathode plates with anode sections interposed therebetween.

2 Claims, 5 Drawing Sheets

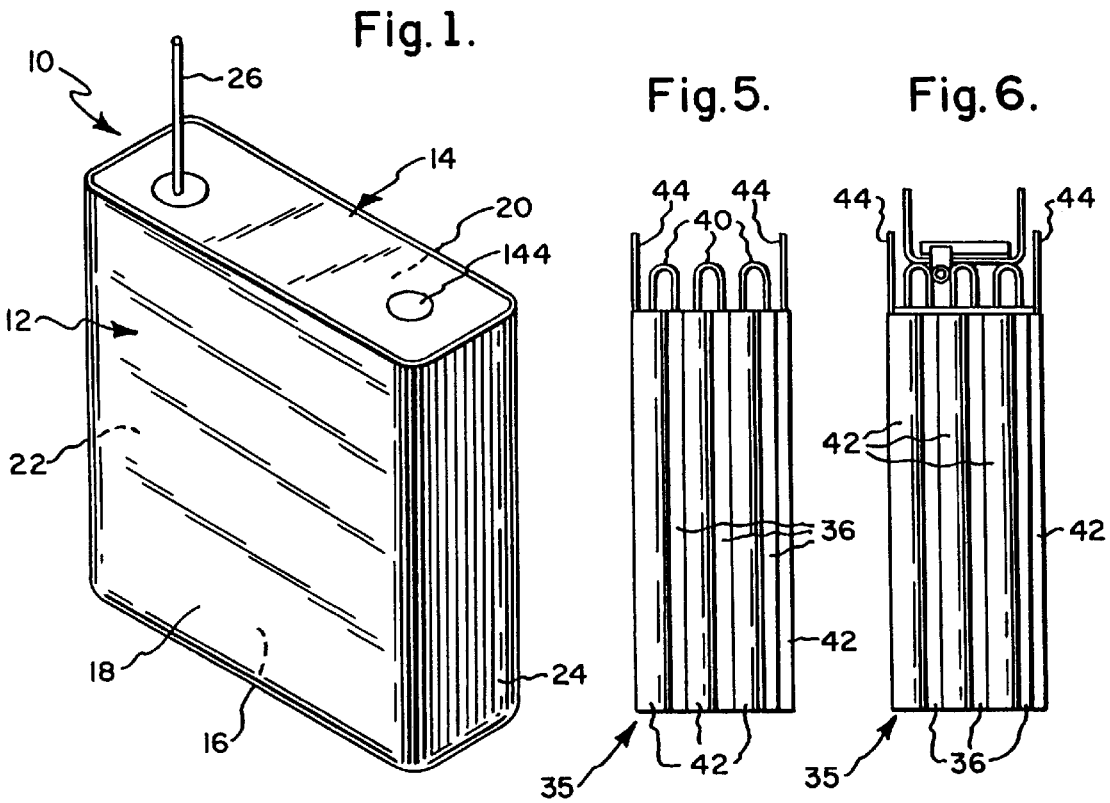
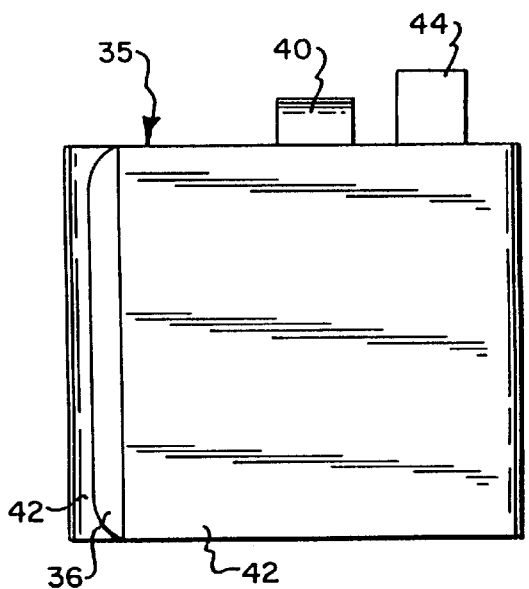
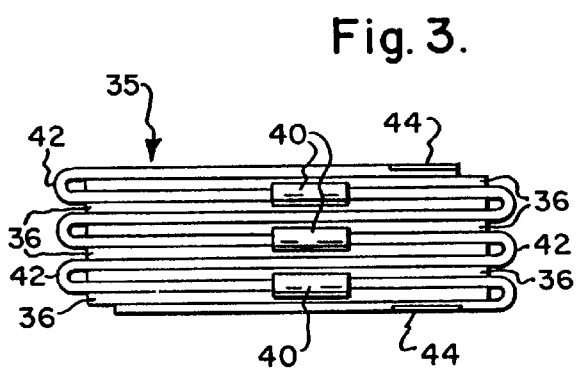

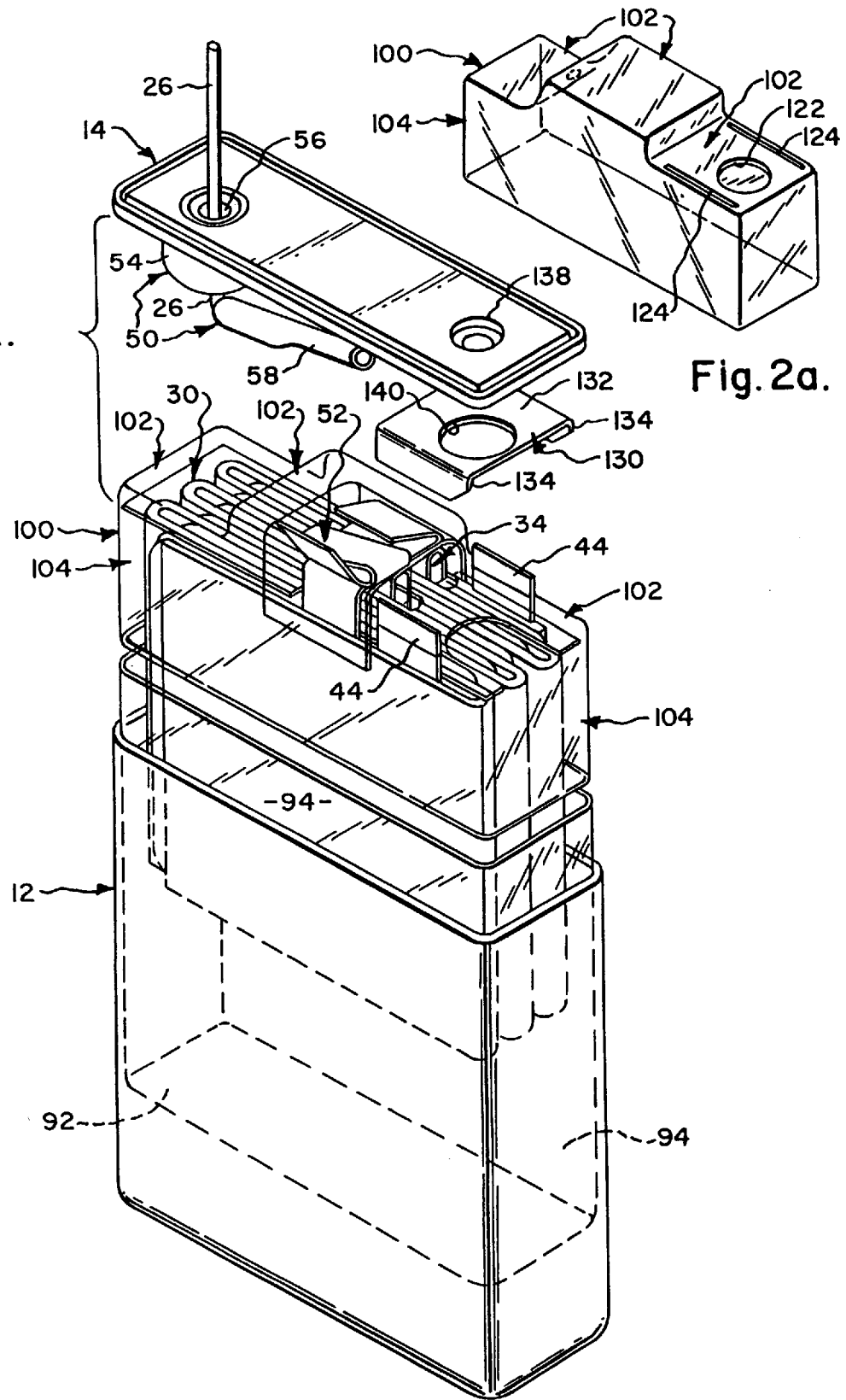

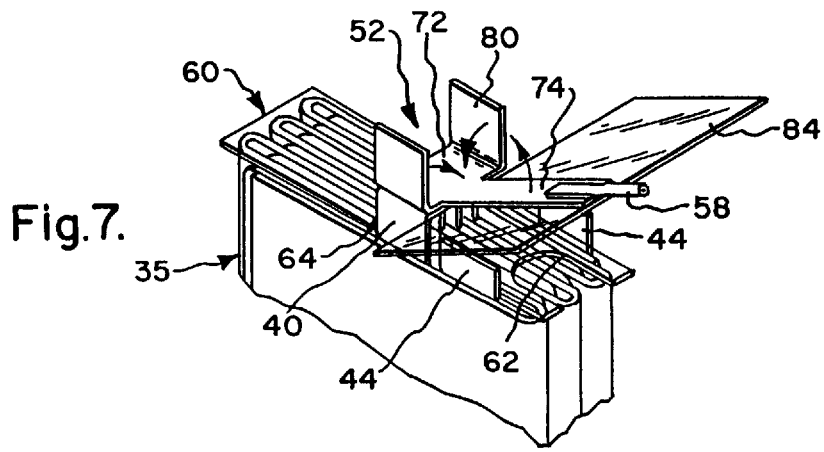
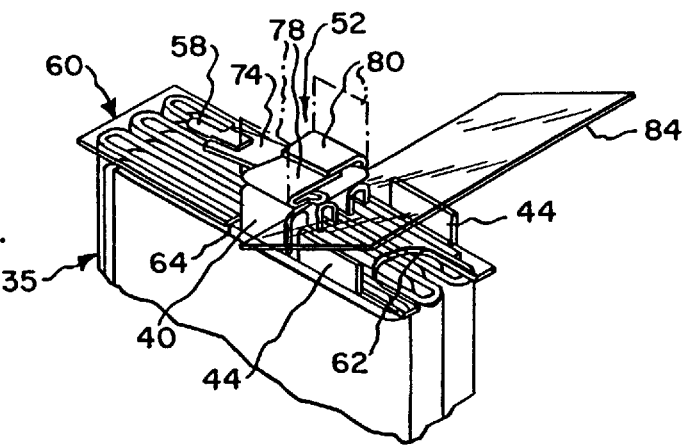
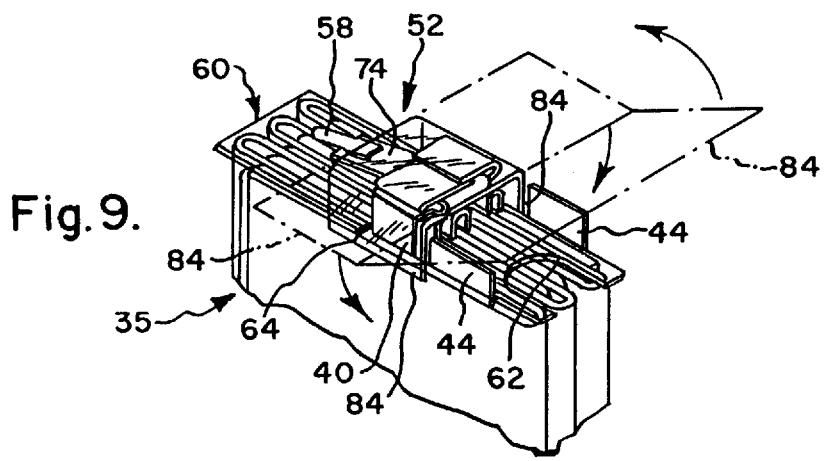

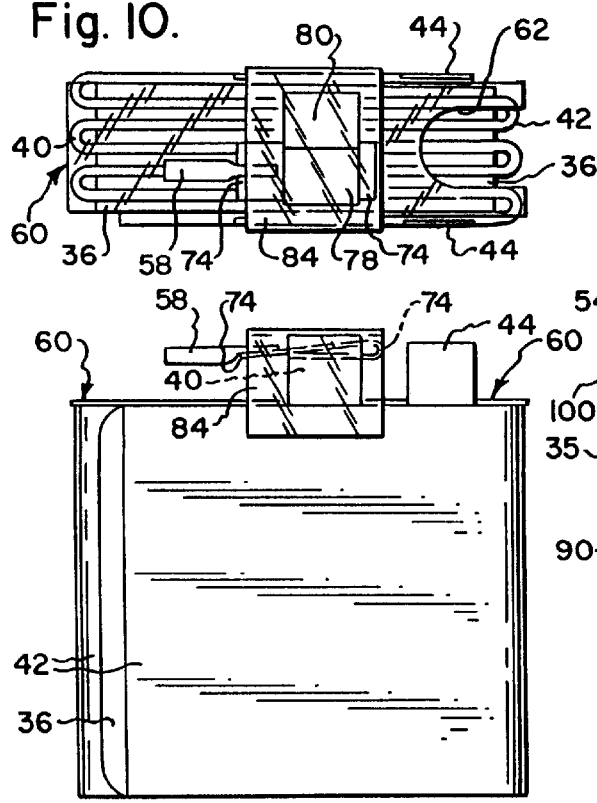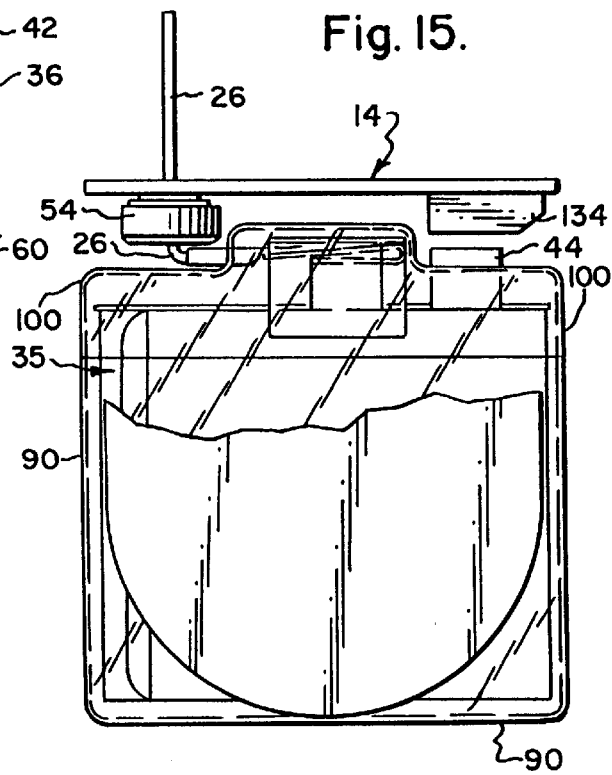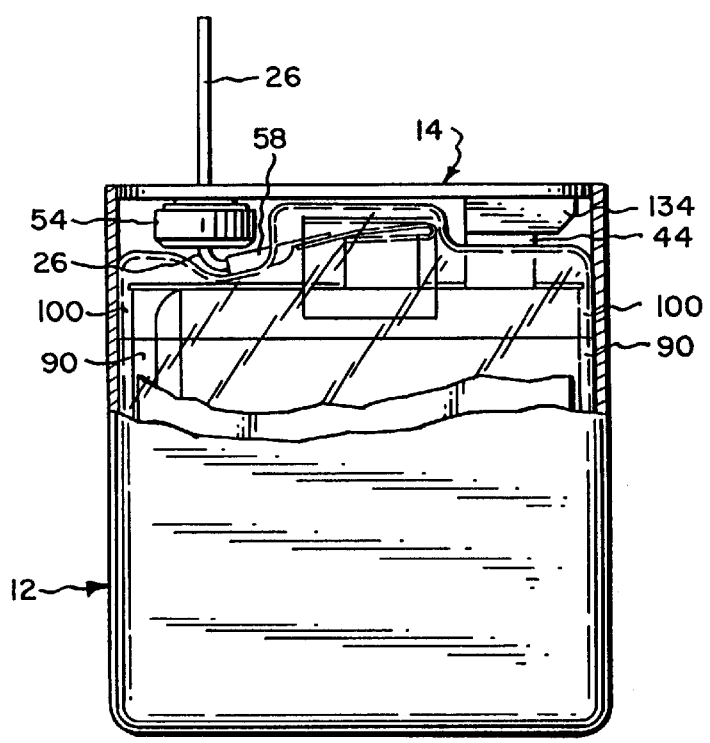

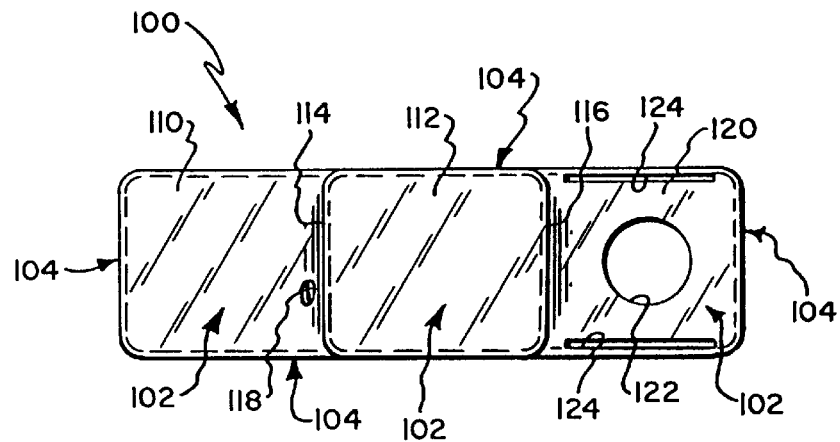
Fig. 13.
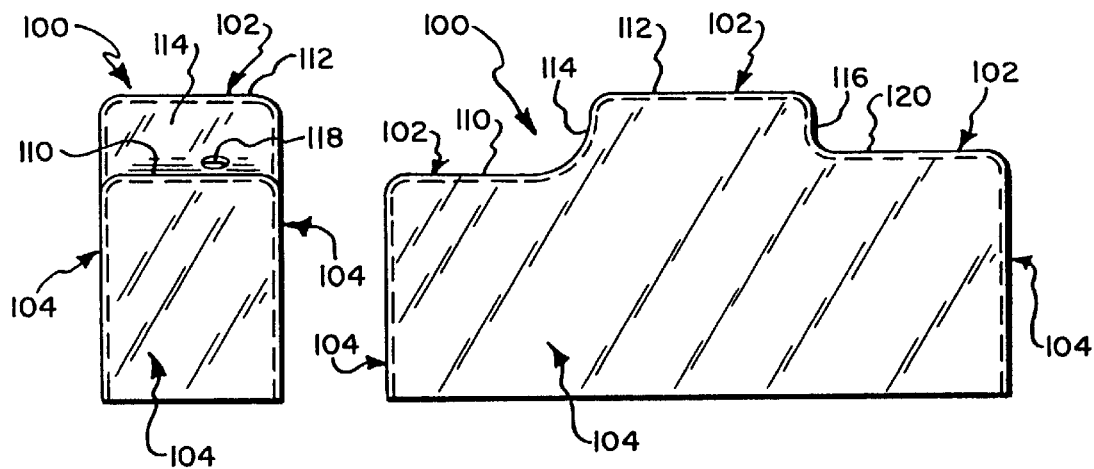
Fig. 14.
Fig. 12.

5,882,362

INSULATING ENCLOSURE FOR LITHIUM BATTERIES

This application is a division of application Ser. No. 08/761,164 filed Dec. 6, 1996, now U.S. Pat. No. 5,744,261, application Ser. No. 07/886,725 filed May 21, 1992, now abandoned.

BACKGROUND OF THE INVENTION

This invention relates to the art of lithium batteries, and more particularly to a new and improved insulating arrangement and method for preventing internal loading and short circuiting in such batteries.

One area of use of the present invention is a multi plate lithium battery for delivering high current pulses, although the principles of the present invention can be variously applied. In lithium batteries wherein the lithium anode and the outer conductive case are at the same electrical potential, it has been determined according to the present invention that internal loading and short circuiting can result from formation of lithium clusters between cathode and anode surfaces. In particular, in prior lithium battery designs a cell stack assembly comprising a plurality of cathode plates with anode sections interposed therebetween was placed into a bag of insulating material. Cathode bridge components associated with the arrangement for electrical connection to the cathode plates and separator components were isolated from contact with other electrically conductive materials through the use of insulating straps strategically placed over the components.

Although the foregoing design functions well, skill is required to assemble such components. In addition, parts may shift in later handling and assembly operations, thus requiring an inordinate amount of care in further assembly. Such shifting of parts can expose the cathode bridge thereby providing a direct path between anode and cathode surfaces along which the above-mentioned lithium clusters can form.

It would, therefore, be highly desirable to provide a barrier which blocks such direct path between anode and cathode surfaces and which effectively isolates components of different electrical potential thereby preventing internal loading and short circuiting caused by lithium cluster formation.

SUMMARY OF THE INVENTION

It is, therefore, a primary object of this invention to provide a new and improved lithium cell and method of making the same wherein internal loading and short circuiting are prevented.

It is a further object of this invention to provide such a cell and method wherein any formation of lithium clusters does not result in internal loading and short circuiting.

It is a more particular object of this invention to provide such a cell and method wherein a barrier is provided to block any direct path between anode and cathode surfaces and to effectively isolate components of different electrical potential thereby preventing internal loading and short circuiting caused by lithium cluster formation.

It is a further object of this invention to provide an insulating arrangement and method which prevents internal loading and short circuiting caused by lithium cluster formation.

The present invention provides, a lithium electrochemical cell including an anode and cathode assembly with the anode connected electrically to a conductive cell casing and an insulated cathode conductor extending through a lid at an end of the casing and connected to a cathode lead near the lid and with first insulating means for insulating the casing from cell components therein and extending along and within the casing from a closed end thereof toward the lid, and which is characterized by second insulating means for insulating the lid from components in the casing and extending along within the lid and toward the first insulating means so as to prevent a short circuit between the lid or casing and the cathode assembly caused by formation of lithium clusters in the region between the lid or casing and the cathode connector means. Preferably the second insulating means is in the form of a cup having a relatively thin base portion extending along the lid and a relatively thin wall portion extending from the base along within the casing and toward the first insulating means which also is in the form of a thin-walled cup. The walls of the first and second insulating means preferably meet in overlapping relation. The insulating arrangement is particularly adapted for use in a cell wherein the anode and cathode assembly comprises a plurality of cathode plates with anode sections interposed therebetween.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a perspective view of an electrochemical cell provided with an insulating arrangement according to the present invention;

FIG. 2 is a developed view illustrating assembly of the cell of FIG. 1 including the insulating arrangement of the present invention;

FIG. 2a is a perspective view of the insulating enclosure or bag included in the cell of FIG. 2 according to the present invention;

FIG. 3 is a top plan view of the anode-cathode cell stack assembly in the cell of FIGS. 1 and 2;

FIG. 4 is a side elevational view of the assembly of FIG. 3;

FIG. 5 is an end elevational view of the assembly of FIG. 3;

FIG. 6 is a view similar to FIG. 5 showing the assembly provided with additional components for forming the cathode bridge;

FIGS. 7–9 are fragmentary perspective views illustrating in sequence the steps in forming the cathode bridge;

FIG. 10 is a top plan view of a completed cell stack assembly after the procedure of FIGS. 7–9;

FIG. 11 is a side elevational view of the assembly of FIG. 10;

FIG. 12 is a side elevational view of the insulating enclosure or bag shown in FIG. 2a;

FIG. 13 is a top plan view of the enclosure of FIG. 12;

FIG. 14 is an end elevational view of the enclosure of FIG. 12;

FIG. 15 is a side elevational view with parts removed illustrating the cell of FIG. 1 at a stage of assembly near completion; and FIG. 16 is a view similar to FIG. 15 showing the cell finally completed.

DETAILED DESCRIPTION OF THE ILLUSTRATED EMBODIMENT

An electrochemical cell generally designated 10 including the insulating arrangement according to the present invention is shown in FIG. 1. Cell 10 includes a conductive casing of metal such as stainless steel closed at one end and having an opening at the opposite end thereof closed by a conductive lid 14, also of metal such as stainless steel. In particular, casing 12 includes a bottom 16, a pair of upstanding spaced apart and substantially parallel sidewall portions 18, 20 and a pair of upstanding spaced apart substantially parallel end wall portions 22 and 24 which meet the sidewall portions at substantially rounded corners. Lid 14 is welded in the open end of casing 12 to complete the cell assembly and is provided with terminal lead means 26 thereon for making electrical connection to a load in a manner which will be described.

Referring now to FIG. 2, the electrochemical cell 10 further comprises a lithium anode assembly generally designated 30 within casing 12 and connected electrically thereto in a manner which will be described, and a cathode assembly generally designated 32 within casing 12 and having cathode lead means generally designated 34 extending therefrom in a region near lid 14 in the completed cell 10. Anode assembly 30 and cathode assembly 32 together comprise a cell stack assembly 35. As will be described in detail presently, the cathode assembly 32 is electrically connected to terminal lead 26. In preferred form, cathode assembly 32 comprises a plurality of plates, and the lithium anode assembly 30 has a plurality of sections interposed between the cathode plates. In particular, and referring to FIGS. 3–5, the cathode plates 36 are arranged in a stack most clearly seen in FIG. 3. Each of the cathode components or plates 36 comprises cathode active material, for example a mixture of silver vanadium oxide and a binder such as Teflon, pressed to form a pellet which then is enclosed in an envelope of separator material, for example polypropylene or polyethylene. For a more detailed description of exemplary cathode plates and a manner of making the same, reference may be made to U.S. Pat. No. 4,830,940 issued May 16, 1989, assigned to the assignee of the present invention, the disclosure of which is hereby incorporated by reference. In the particular arrangement shown herein, there is a common cathode current collector or conductor for two adjacent plates. It includes a pair of enlarged body portions each of which is received in the corresponding cathode plate or pellet 36 and a relatively smaller lead portion joining the two body portions and in the form of a loop 40 as shown in FIGS. 3–5. The anode means 42 comprises a pair of elongated ribbon like lithium elements pressed together against opposite sides of an anode current collector or a conductor to form an elongated anode structure which is encapsulated in separator material, such as the afore-mentioned polypropylene or polyethylene. For a more detailed description of a method for forming a typical anode, reference may be made to the above mentioned U.S. Pat. No. 4,830,940. The anode structure is folded at spaced intervals along the length thereof to form a serpentine-like structure as shown most clearly in FIG. 3 to receive between the folds thereof the plurality of cathode plate. Opposite ends of the anode structure are provided with extensions 44 of the anode current collector for making electrical connection to the conductive casing 12 in a manner which will be described.

The electrochemical cell 10 further comprises insulated cathode conductor means generally designated 50 in FIG. 2 extending through lid 14 and having an outer end in the form of terminal lead 26 for making electrical connection to an external load and having an inner end adjacent the cathode assembly 32. There is also provided cathode connector means generally designated 52 for making electrical connection between the inner end of the cathode conductor means 50 and cathode lead means, i.e. the loops 40 of the cathode assembly 32, the connector means 52 being located in close proximity to lid 14 in the assembled and completed cell. As shown in FIG. 2, the cathode conductor means 50 includes an inwardly extending portion of lead 26 which is insulated from lid 14 by an insulator 54 and sealed therein by a glass-to-metal seal 56. A coupling sleeve 58 joins lead 26 to the cathode connector means 52 or bridge arrangement for ultimate connection to cathode loops 40 in a manner which will be described, sleeve 58 being shown disconnected from bridge 52 in FIG. 2 for convenience in illustration. For a more detailed description of insulator 54, seal 56 and coupling sleeve 58, reference may be made to the above identified U.S. Pat. No. 4,830,940.

FIGS. 7–9 show in further detail the arrangement including the cathode bridge for making electrical connection between the cathode loops 40 and terminal lead 26. A cell stack insulating cover generally designated 60 is located on the top of the cell stack. It is an elongated rectangular strip and provided with a formation 62 at one end defining a fill opening for use in a manner which will be described. It is-also provided between the ends thereof with a series of slots, one of which is designated 64 in FIGS. 7–9, for receiving the loops 40 extending between the cathode plates. The remaining portion of rectangular cover 60 extending to the opposite end is solid. Cover 60 is of a size and shape to cover the top of the cell stack and to fit within casing 12, and a preferred material for cover 60 is Tefzel.

The cathode bridge component, generally designated 52 is provided for making electrical connection from the cathode lead 26 through cathode loops 40 and ultimately to the terminal lead 26 in a manner which will be described. Bridge 52 includes a main body portion 72 which is spot welded or otherwise connected to the outer ends of the cathode loops 40 as shown in FIG. 7. It is provided with a tab-like extension 74 which is welded to cathode sleeve 58 as shown in FIG. 7 for making electrical connection to cathode lead 26. The main body portion 72 extends to a pair of tabs 78,80. There is also provided a cathode insulator in the form of a sheet 84 for electrically insulating the cathode bridge from casing 12 and lid 14 in a manner which will be described.

The foregoing arrangement is assembled in the following manner. The main body 72 of cathode bridge 52 is welded to the cathode tabs 40 as previously described. Tabs 78,80 and extension 74 are initially in the upstanding and inclined positions, respectively, shown in FIG. 7. Extension 74 then is folded so that sleeve 58 is in position to receive cathode lead 26 as shown in FIG. 8 whereupon tabs 78,80 are folded onto extension 74 and each other in the manner shown in FIG. 8. Finally insulator 84 is folded onto the tabs 78,80 so as to cover the same and then the ends thereof are folded toward the anode-cathode stack to completely cover the bridge structure as shown in FIG. 9. The completed arrangement is shown in FIGS. 10 and 11.

The cell of the present invention further comprises first insulating means generally designated 90 for insulating casing 12 from components therein and extending along and within the casing from the closed end thereof and toward lid 14. The first insulating means 90 is in the form of a cup or bag having a relatively thin base portion 92 extending along the closed end 16 of casing 12 and a relatively thin wall portion 94 extending from base 92 along within casing 12 toward lid 14. In assembling cell 10 according to the method of the present invention, the anode-cathode subassembly is placed first in bag 90 and then the resulting combination inserted into casing 12. Alternatively, the bag 90 is placed in casing 12 whereupon the anode cathode subassembly of FIG. 10 is placed in bag 90 with the leads exposed at the open end of the casing.

When lid 14 is placed within the open end of casing 12 in completing the assembly of cell 10, the cathode electrical connector means or bridge 52 is located adjacent lid 14. In electrochemical cells of this type wherein the lithium anode 30 and the outer conductive case 12 and lid 14 are at the same electrical potential, it has been determined according to the present invention that internal electrical loading and short circuiting can result from formation of lithium clusters between surfaces at the cathode and anode potentials. To the extent that any direct path exists between anode and cathode potential surfaces, the formation of such lithium clusters is enhanced. In accordance with the present invention there is provided a barrier which blocks such direct path between the anode and cathode potential surfaces and which effectively isolates the cell components of different electrical potential thereby preventing internal electrical loading and short circuiting caused by the lithium cluster formation.

In particular, the present invention provides second insulating means generally designated 100 for insulating lid 14 from components in casing 12 and extending along within lid 14 and toward the first insulating means 90 so as to prevent a short circuit between the lid or casing and the cathode assembly caused by formation of lithium clusters in the region between the lid or casing and the cathode connector means 52. In preferred form, the second insulating means 100 is in the form of a cup or bag having a relatively thin base portion 102 extending along lid 14 and a relatively thin wall portion 104 extending from base 102 along within casing 12. Preferably the walls 94 and 104 of the first and second insulating means 90 and 100, respectively, meet in an overlapping relation in the completed and assembled cell.

The second insulating means 100 is shown in further detail in FIGS. 2A and 12–14. The base portion 102 includes three sections and the first, designated 110, is substantially flat or planar and is located inwardly of insulator 54 in a completed cell. A second section of base 102 forms a pocket to receive cathode bridge 52 and includes a flat or planar outer wall 112 and a pair of depending end walls 114 and 116. Each wall 114 meets section 110 in a curved portion thereof. A small diameter aperture or opening 118 is provided in wall 114 to provide access for cathode conductor sleeve 58 to cathode bridge 52. A third section 120 of base 102 is substantially flat or planar like section 110 and is disposed in a plane which is substantially parallel to and located between the planes of portion 110 and outer wall 112 as shown in FIG. 12. Section 120 meets end wall 116 in a rounded but substantially right angle corner. Section 120 is provided with a central opening 122 which registers with formation 62 of the cell stack insulating cover 60 to define an opening through which liquid electrolyte is introduced during filling of the cell as will be described. Section 120 also is provided with mutually parallel elongated slots 124 disposed longitudinally of base 102, located outwardly of opening 122 and near the corner juncture between base 102 and wall 102. Slots 124 receive anode tabs 44 which extend to make electrical connection with lid 14 as will be described.

The electrochemical cell 10 is made according to the method of the present invention as follows. First the conductive casing 12 is provided in a manner well-known to those skilled in the art. The anode-cathode subassembly 35 is provided as described in detail hereinabove in connection with FIGS. 2–10. The first insulating means in the form of cup or bag 90 is provided, being formed according to well-known techniques for making articles from thin-walled plastic material. A preferred material for bag 90 is an insulating material commercially available under the designation Tefzel. Then, the anode-cathode assembly 35 is placed in bag 90 with the base 92 of bag 90 extending along the one end of assembly 35 which ultimately faces casing bottom wall 16 and with wall 94 of bag 90 extending toward the end of assembly 35 including anode leads 44 and cathode bridge 52 as shown in FIGS. 2 and 15.

The second insulating means in the form of cup or bag 100 is provided, being formed according to well-known techniques for making articles from thin-walled plastic material. A preferred material for bag 100 also is Tefzel material. Then bag 100 is positioned in place with the base 102 thereof extending over the end of anode-cathode sub assembly 35 including cathode bridge 52 and the wall 104 thereof extending along assembly 35 toward the first bag 90. Bag 100 is positioned in a manner such that anode leads 44 extend through the openings or slots 124 and cathode sleeve 58 extends through opening 118. According to a preferred mode of the present invention, walls 94 and 104 of bags 90 and 100, respectively, meet in substantial overlapping relation. The foregoing is illustrated in FIGS. 2 and 15.

The next step in the method of the present invention is providing a header assembly including conductive lid 14 in a manner such that the anode lead is in electrical contact with conductive lid 14 and the cathode lead extends through an opening in lid 14 and is electrically insulated therefrom. As shown in FIGS. 2 and 15, cathode lead 26 is joined to sleeve 58 with the ends of sleeve 58 and tab 74 being bonded together in a suitable manner. Electrical connection between anode tabs 44 and lid 14 is facilitated by a connector member 130 of suitable metal comprising a base 132 which is spot welded or otherwise suitably joined to the inner surface of lid 24 and a pair of depending legs or blades 134 disposed substantially at right angles to base 132. Blades 134 are located so as to facilitate bonding to anode tabs 44 when lid 14 is placed in the end of casing 12 as shown in FIG. 16 whereby electrical connection is made between anode 30 and the lid 14 casing 12 combination.

FIG. 15 shows the anode-cathode subassembly 35 in bags 90 and 100 with the header assembly connected thereto. The next step in the method of the present invention is placing the assembly of FIG. 15 in casing 12 such that base 92 of bag 90 extends along the closed end 16 of casing 12, wall 94 of bag 90 extends toward the open end of casing 12 and the header assembly is in the open end of casing 12.

FIG. 16 shows cell 10 at the stage of assembly wherein lid 14 is placed in the open end of casing 12 and blades 134 are in contact with anode tabs 44. The next step in the method of the present invention is sealing the header assembly to the casing 12. In particular, this is carried out when lid 14 is in the position of FIG. 16. Lid 14 is joined by welding in a known manner around the periphery thereof to the corresponding edge of casing 12 defining the open end thereof. The final step in the method of the present invention is introducing electrolyte to the casing 12 through aligned fill openings in lid 14 and bag 100 and sealing the lid opening thereafter. In particular, lid 14 is provided with a fill opening 138 which is aligned with an opening 140 in base 132 of connector 130. These openings, in turn, are aligned with opening 122 in base 102 of bag 100 which is aligned with formation 62 of cover 60. The foregoing provides a path for flow of liquid electrolyte from a source to the cell stack assembly 35, typically being introduced by a fill tube in a known manner. Upon completion of the foregoing, opening 138 in lid 14 is closed by a plug 144, being sealed therein in a known manner.

The electrochemical cell 10 operates in a manner similar to that of the cell disclosed in the above-referenced patent 4,830,940. During operation of cell 10, bag 100 prevents a short circuit between lid 14 or casing 12 and the cathode electrical connections caused by formation of lithium clusters in the region between lid 14 and the cathode electrical connection including lead 26, tab 76, cathode bridge 52 and loops 40.

It is therefore apparent that the present invention accomplishes its intended objects. There is provided a new and improved lithium cell and method of making the same wherein any formation of lithium clusters does not result in internal loading and short circuiting. A barrier is provided to block any direct path between anode and cathode surfaces and to effectively isolate components of different electrical potential thereby preventing internal loading and short circuiting caused by lithium cluster formation.

What is claimed is:

1. A method of making an electrochemical cell comprising the teps of:
   a) providing a conductive casing closed at one end and open at the other end;
   b) providing a first bag of insulating material having a base and having a wall extending from said base toward an open end of said bag;
   c) providing an anode-cathode subassembly including a lithium anode and cathode and anode leads and placing said subassembly in said first bag with said leads extending in the direction of said open end of said casing;
   d) providing a second bag of insulating material having a base and having a wall extending from said base toward an open end of said bag;
   e) placing said second bag of insulating material over said anode-cathode subassembly with the wall of said second bag extending along said assembly toward said first bag, said anode and cathode leads extending through openings provided in said second bag;
   f) providing a header assembly including a conductive lid casing in a manner such that said anode lead is in electrical contact with said conductive lid and said cathode lead extends through an opening in said lid and is electrically insulated therefrom;
   g) placing said anode-cathode assembly in said casing in a manner such that the base of said first bag extends along said closed end of said casing, said wall of said first bag extends toward the open end of said casing and said header assembly is in said open end of said casing;
   h) sealing said header assembly to said casing; and
   i) introducing electrolyte to said casing through aligned fill openings in said lid and said second bag and sealing said lid opening thereafter;
   j) so that said second bag of insulating material prevents a short circuit between said lid or casing and said cathode lead caused by formation of lithium clusters in the region between said lid or casing and said cathode lead.

2. A method according to claim 1, wherein said second bag of insulating material is placed on said anode-cathode subassembly in a manner such that the walls of said first and second bags meet in overlapping relation.

\* \* \* \* \*

UNITED STATES PATENT AND TRADEMARK OFFICE
CERTIFICATE OF CORRECTION

PATENT NO.   : 5,882,362
DATED        : March 16, 1999
INVENTOR(S)  : Barry C. Muffoletto et al.

It is certified that error appears in the above-identified patent and that said Letters Patent is hereby corrected as shown below:

Column 7,
Line 20, "teps" should be -- steps --.

Signed and Sealed this

Fourth Day of June, 2002

Attest:

Attesting Officer

JAMES E. ROGAN
Director of the United States Patent and Trademark Office